Patented Mar. 3, 1942

2,275,152

UNITED STATES PATENT OFFICE 2,275,152

PROCESS FOR HYDROGENATING ALIPHATIC CARBOXYLIC ACID ANHYDRIDES

Wilbur A. Lazier, Wilmington, Del., assignor to E. I. du Pont de Nemours & Company, Wilmington, Del., a corporation of Delaware No Drawing. Application January 2, 1932, Serial No. 584,574

6 Claims. (Cl. 260—638)

This invention relates to a process for catalytically hydrogenating organic compounds and more particularly it pertains to the catalytic hydrogenation of carboxylic acid anhydrides. This application is in part a continuation of my co-pending applications Serial No. 445,224, filed April 17, 1930, Serial No. 470,238, filed July 23, 1930, and Serial No. 520,473, filed March 5, 1931.

For many years the successful hydrogenation of carboxylic acids and derivatives thereof has been accompanied by considerable difficulty, and in the main, it has been practically impossible to carry out known processes with any degree of success on a commercial scale. The processes heretofore known to the art which are at all feasible involve an indirect procedure attended with considerable tedious detail and expense. One known process, namely that described by Bouveault and Blanc in 1904, comprises reducing an ester of a carboxylic acid to the corresponding alcohol by means of metallic sodium in anhydrous alcoholic solution. Another method, according to Rosenmund, depends on the hydrogenation of an acid chloride to the aldehyde in the presence of a palladium catalyst. Sabatier and Mailhe have described a reaction in which acetic acid may be reduced to acetaldehyde by passing it together with formic acid or carbon monoxide over a mangenese oxide catalyst.

It has been discovered, in accordance with the teachings of the present invention, that, under suitable conditions, and in the presence of a properly selected catalyst, anhydrides of carboxylic acids can be readily and inexpensively hydrogenated to produce corresponding alkyl compounds, for example alcohols.

One object of the invention relates to the process for successfully hydrogenating anhydrides of carboxylic acids. A more specific object pertains to the use of hydrogenating metal chromites preferably in the form of a mixture of such chromites for the hydrogenation of anhydrides of carboxylic acids. Other objects of the invention will become apparent from the following detailed description of the invention.

The anhydrides of carboxylic acids which may be hydrogenated in accordance with the present invention are those of the aliphatic carboxylic acids containing more than one carbon atom per carboxyl group. These include the anhydrides of acids obtained by the hydrolysis of naturally occurring fats and oils. The general method involved in transforming these anhydrides to the corresponding alcohols comprises contacting a mixture of the anhydrides and hydrogen with a hydrogenating catalyst under a superatmospheric pressure and at an elevated temperature.

The following examples are given for the purpose of illustrating specific methods for making catalysts that may be used for the carrying out of the reaction.

Example 1

A hydrogenation catalyst is prepared as follows: 23 grams of cadmium nitrate, 24 grams of copper nitrate, and 245 grams of zinc nitrate are dissolved in 500 cc. of water and mixed at ordinary temperature with an equal volume of water containing 126 grams of ammonium bichromate and 75 cc. of 28% ammonium hydroxide. After stirring, the mixture is exactly neutralized with additional ammonium hydroxide and allowed to settle. After several washes by decantation, the precipitate is dried, ignited at 400° C. and compressed into tablets or grains suitable for use in catalytic gas apparatus.

Example 2

A copper catalyst is prepared by fusing 8 parts by weight of pure copper oxide with one part of zinc oxide and one part of magnesium oxide. The cooled mass is crushed, screened, and reduced at 150° C. in a stream of diluted hydrogen containing 80% carbon dioxide and 20% hydrogen.

Example 3

A copper chromite catalyst is prepared by igniting copper ammonium chromate to its decomposition temperature. The catalyst may be reduced in a stream of hydrogen previous to its use or it may be employed directly, reduction taking place in the presence of hydrogen during the reaction. Two hundred cc. of liquid n-butyl acetate and 260–300 liters of hydrogen are passed over 25 cc. of the catalyst per hour at a temperature of 325° C. and at a pressure of 2600–3200 lbs. per square inch.

The following example is given for the purpose of specifically illustrating the applicant's invention.

Example 4

A zinc chromite catalyst promoted with copper chromite was prepared by igniting a co-precipitated mixture comprising 0.9 mole of zinc ammonium chromate and 0.1 mole of copper ammonium chromate. One hundred cc. of the briquetted catalyst was placed in a high-pressure tube and heated to 390° C. At this temperature and at a pressure of 2800 lbs. per square inch, acetic anhydride was pumped over the catalyst at the rate of 100 cc. per hour together with an excess of hydrogen flowing at the rate of about seven cu. ft. per hour. The liquid reaction products were condensed under pressure and separated from the excess gas. A careful analysis of the condensate gave the following results:

| Compound formed | Weight percent in condensate |
| --- | --- |
| Acetic anhydride | 0.0 |
| Acetone | 5.6 |
| Acetic acid | 5.3 |
| Ethyl acetate | 14.4 |
| Ethyl alcohol | 49.2 |
| N-butanol | 11.1 |
| Water and unidentified products | 14.4 |

The success of this invention makes it possible to obtain a wide variety of alcohols, directly from easily obtainable and in many instances natural occurring compounds which have hitherto been unrecognized as a source from which such products could be obtained successfully on a commercial scale.

Although certain definite conditions of application, such as temperature, pressure and rate of flow of the material to be treated over the catalyst, have been indicated in the above examples, it will be apparent that these factors may be varied within wide limits. The preferred temperature range is in the neighborhood of 300°–400° C., the exact temperature used depending somewhat on the catalyst composition selected for a given reaction. The invention is not to be limited to the preferred lower limit of 300° C. since temperatures in excess of 200° C. are operable. The process depends upon the use of elevated pressure, the range of pressure which may be used varying from 10 atmospheres up to the limit of a pressure which the apparatus will withstand, the preferred pressures being in the neighborhood of 300 lbs./sq. in. or above about 2000 lbs./sq. in. The pressures desired will vary according to the specific acid derivative under treatment and upon the amount of conversion desired.

It will be apparent from the above examples that the method of my invention is applicable to anhydrides of carboxylic acids in general, but may be used with particular advantage for the hydrogenation of the anhydrides of aliphatic monobasic acids to the corresponding monohydric alcohols. It is also valuable for the hydrogenation of anhydrides of dibasic and other polybasic acids to the corresponding glycols and other types of alcohols. It is especially adapted to the hydrogenation of the anhydrides of acids having more than one carbon atom per carboxyl group. It may also be employed effectively for the hydrogenation of anhydrides of hydroxy and ketonic acids, yielding thereby useful glycols. It is also apparent that mixtures of anhydrides of aliphatic carboxylic acids may be converted to mixtures of alcohols. For example, I may take the anhydrides of the mixed acids contained in a fat such as coconut oil and without separation into their various components convert them to a mixture of the corresponding alcohols of high molecular weight. The hydrogenation of anhydrides yields the corresponding alcohols and a greater or lesser per cent of ester formed by interaction of the higher monobasic alcohols and the carboxyl radical.

The ratio of hydrogen to acid anhydride may be varied over a wide range, but I prefer to use about 5 to 10 moles of hydrogen per mole of acid derivative for most conversions.

The rate at which the acid anhydride may be pumped over the catalyst is a function of the catalytic activity and also of the molecular weight of the compound. An active hydrogenating catalyst will ordinarily convert about 4 to 8 times its volume of acid anhydride per hour. Higher rates of flow may be employed at the expense of slightly lower conversions.

Catalysts especially suitable for the purposes of the present invention may consist of a mixture of difficultly reducible oxides of hydrogenating metals. I prefer to use compositions in which the oxides are in the form of the chromites of the metals. An effective catalyst comprises the mixture of chromites or chromates of different hydrogenating metals and containing also some of the oxides of those metals. A catalyst of this type may be prepared by the manner described in Example 1. Mixed catalyst compositions of this type have a catalytic effect in general which is greater than the sum of the effects of its constituent oxides or chromites. The mixed chromite catalyst preferably contains a small amount of chromite or oxide of one or more hydrogenating metals whose oxides are readily reducible together with a chromite of one or more hydrogenating metals whose oxides are difficultly reducible, the proportions of the difficultly reducible chromites and of the easily reducible oxides or chromites being capable of wide variation. Suitable hydrogenating metals whose oxides are readily reducible are silver, cadmium, copper, lead, mercury, tin, bismuth, iron, cobalt and nickel. Hydrogenating metals whose oxides are difficultly reducible are magnesium, zinc and manganese. In the above type of catalysts these oxides are combined and/or intimately associated with chromium oxide.

While the catalyst previously described is preferred because of the higher conversion obtained, it is to be understood that other good hydrogenating catalysts are suitable. These hydrogenating catalysts may be either in the form of reduced metals or oxides of the mixtures of the same. For example, I may use such reduced metals as copper, tin, cadmium or lead and in certain cases iron and nickel. Good results are obtained with fused reduced copper oxide alone. The copper oxide catalyst may be promoted with the well known oxide promoters, for example, the difficultly reducible hydrogenating metal oxides, as is illustrated in Example 2. Hydrogenating metal oxide catalysts are likewise suitable for the reaction. These oxide catalysts may likewise be promoted by the addition of other oxides preferably those having a more acidic character. Examples of promoting oxides are the oxides of chromium, molybdenum, tungsten and titanium. Those oxide catalysts which are promoted by the addition of chromium oxide are highly satisfactory. Thus, zinc oxide or copper oxide to which has been added amounts of chromium oxide which may be varied within wide limits, are quite effective. As particularly good catalysts, I may use chromates or chromites of hydrogenating metals. The preparation of catalysts of this latter type containing a single hydrogenating metal are described in my U. S. Patents 1,746,782 and 1,746,783. The chromite catalysts described in these U. S. patents may be prepared either by igniting a simple chromate of a hydrogenating metal thereby reducing the chromium from the hexavalent to the trivalent form, or by heating a double ammonium chromate of a hydrogenating metal to its spontaneous decomposition temperature.

The above description and specific examples are to be considered as illustrative only and not as limiting the scope of the invention. Any modification or variation therefrom which conforms with the spirit of the invention is intended to be included within the scope of the claims.

I claim:

1. The process of producing alcohols which comprises treating with hydrogen an anhydride of an aliphatic carboxylic acid containing more than one carbon atom per carboxyl group at a temperature in excess of 200° C. and under a pressure in excess of 10 atmospheres, in the presence of copper oxide intimately associated with an oxide of chromium.

2. The process of producing alcohols which comprises treating with hydrogen an anhydride of an aliphatic carboxylic acid, said acid containing more than one carbon atom per carboxyl group at a temperature in excess of 200° C. and under a pressure in excess of 10 atmospheres in the presence of copper chromite.

3. A process in accordance with claim 2 characterized in that the reaction is carried out at a temperature between about 300° C. and about 400° C. and at a pressure above about 2000 lbs./sq. in.

4. The process of producing alcohols which comprises treating with hydrogen an anhydride of an aliphatic carboxylic acid, said acid containing more than one carbon atom per carboxyl group at a temperature in excess of 200° C. and under a pressure in excess of 10 atmospheres, in the presence of a copper-containing hydrogenation catalyst activated by a substance comprising an oxide of chromium.

5. The process of producing alcohols which comprises treating with hydrogen an anhydride of an aliphatic carboxylic acid containing more than one carbon atom per carboxyl group at a temperature in excess of 200° C. and under a pressure in excess of 10 atmospheres, in the presence of zinc chromite promoted with copper chromite.

6. The process of producing alcohols which comprises treating acetic anhydride with hydrogen at a temperature in excess of 200° C. and under a pressure in excess of ten atmospheres in the presence of zinc chromite promoted with copper chromite.

WILBUR A. LAZIER.

CERTIFICATE OF CORRECTION.

Patent No. 2,275,152.     March 3, 1942.

WILBUR A. LAZIER.

It is hereby certified that error appears in the printed specification of the above numbered patent requiring correction as follows: Page 2, first column, line 42, for "300 lbs./sq. in." read --3000 lbs./sq. in.--; and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.